Jan. 30, 1962  H. E. ROBSON  3,019,100
INTEGRATED PROCESS OF ORE REDUCTION AND GAS GENERATION
Filed June 24, 1960
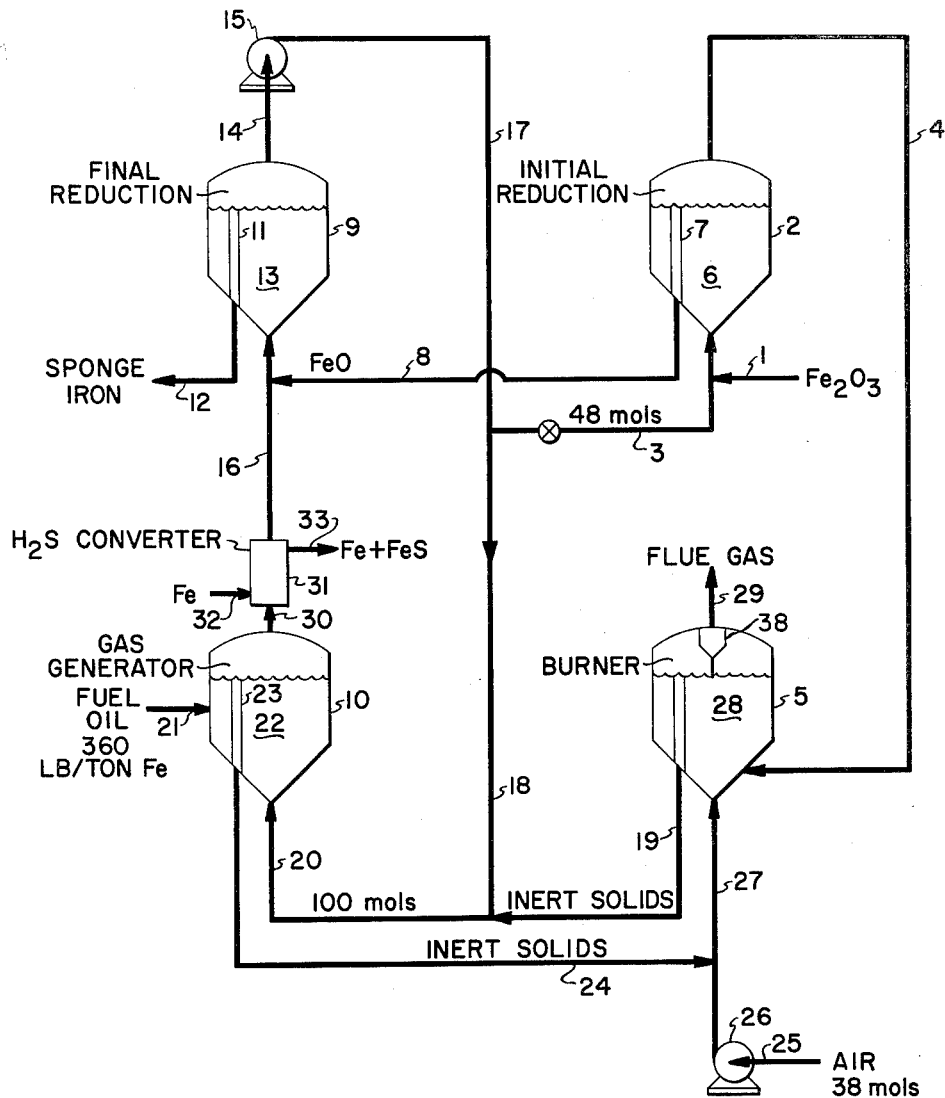
Harry Edwin Robson   Inventor
By  Henry Berls   Patent Attorney

3,019,100
INTEGRATED PROCESS OF ORE REDUCTION AND GAS GENERATION

Harry Edwin Robson, Baton Rouge, La., assignor to Esso Research and Engineering Company, a corporation of Delaware Filed June 24, 1960, Ser. No. 38,494
7 Claims. (Cl. 75—26)

The present invention relates to a direct iron ore reduction for converting $Fe_2O_3$ and $Fe_3O_4$, such as in hematite or magnetite, into sponge iron utilizing a reducing gas low in nitrogen content obtained from recirculated partially spent reducing gas enriched with reducing components.

Existing direct reduction processes have been designed to operate with a once-through flow of reducing gas containing substantial amounts of nitrogen that comes from air used in generating the gas. Some of the processes using gas for reduction involve steps of recycling spent reducing gases after such gases are cooled to a sufficiently low temperature to permit removal of $CO_2$ and $H_2O$, the $H_2O$ being removed by condensation and the $CO_2$ by scrubbing with solvents.

A once-through gas flow process operates at a low energy efficiency due to equilibrium limitations depending on the $CO/CO_2$ and $H_2/H_2O$ ratios in the reduction of FeO for Fe. Steps of cooling, scrubbing, and reheating recycle gas for removal of $CO_2$ and $H_2O$ involve high energy losses in an ore reduction reaction which is more favorably carried out at temperatures above 1600° F.

In the process of the present invention cooling and condensation in the circulated reducing gas streams are eliminated or held to a minimum. The sensible heat carried by the gases is conserved for use in the ore reduction zones and in the gas generation. The cost of recirculating and recycling the gases is kept low by controlling the composition of the gases, e.g., having the gases low in inert nitrogen or substantially free of nitrogen, and by proper separation of the gas streams for different utilization as will be further described.

The direct reduction of iron ore by reducing gas is preferably made to take place in a two-stage fluidized solids unit with a synthesis gas that principally contains CO and $H_2$. Partly spent reducing gas from the final reduction stage where FeO is reduced to Fe is exhausted from that stage by a high temperature compressor which supplies the necessary incremental pressure to circulate these gases through other parts of the system with said compressor receiving all the exhaust gas from the final reduction stage, the output stream from the compressor is split so that the major portion of the compressed gas is recycled to a gas generator while the remaining minor portion of the compressed gas is passed to an initial reduction stage where $Fe_2O_3$ is reduced to form FeO.

Without altering the principles of the invention, exhaust gas from the final reduction stage, and herein termed intermediate gas, can be diverted in a desired proportion to the initial stage ahead of the compressor that circulates the major part of the intermediate gas to the gas generator. Thus, an auxiliary compressor may be used for such diverted gas.

In the synthesis gas generator, the recycled hot partly spent (intermediate) reducing gas reacts with a hydrocarbon fuel to convert $H_2O$ and $CO_2$ to CO and $H_2$ thereby reconstituting the desired synthesis gas used in the final reduction stage. This reaction of the hot recycled gas with the hot hydrocarbon fuel produces a volume increase of about 50%, which thus furnishes the desired amount of gas required by the overall process and which has been found to be a suitable amount to furnish the gas stream which is sent to the initial $Fe_2O_3$ reduction stage. Spent gas which is removed from the initial reduction stage still contains a significant amount of CO and $H_2$ to be used as a fuel, hence this gas can be passed to a burner vessel for burning the preheated air to supply heat utilized in the system.

In the type of system outlined an appropriate, synthesis gas is made in a gas generator where fluidized hot solids supply the necessary heat for reaction of a hydrocarbon fuel with the recycled partly spent reducing gas to convert $CO_2$ and $H_2O$ in the gas to CO and $H_2$. The hot inert solids are circulated between the gas generating zone and a burning zone, the solids being heated to an elevated temperature in the burning zone then being returned to the gas generating zone.

Certain distinctive features are present in the improved process outlined in addition to those already mentioned. The fuel requirement per ton of ore reduced to Fe is very low. It has been found to be about one-third the fuel required for existing direct reduction processes and about one-fifth that required for conventional blast furnace operation, particularly with regard to the fuel used for the reducing gas generation.

The reducing gas employed throughout all stages of iron oxide reduction can be kept substantially free of inert gases, such as nitrogen, and this is beneficial in minimizing the size of equipment for handling the circulation of the gases. With no accumulation of inert gases, say above 1%, losses through purging of low quality gas are eliminated. The process does not require water for making steam or for cooling; and therefore it is of particular value in locations where it is desirable to avoid use of water. The appropriate circulation of the gases through the fluidized solids beds and between the units can be obtained with control by use of the high temperature compressor in the off-gas line from the final reduction stage.

The invention will be further described in detail and examples with reference to the drawing which shows a flow diagram for a preferred mode of operation.

In the drawing, numeral 1 designates a charging line by which finely divided iron ore is supplied to the initial reduction stage vessel 2. The ore charge is in the form of finely ground particles, e.g., 10 to 400 microns, for fluidization. In vessel 2 the ore particles are brought into contact with reducing gas entering vessel 2 from line 3. This gas is of suitable composition and is sufficiently hot to reduce $Fe_2O_3$ and $Fe_3O_4$ in vessel 2 to FeO at a temperature in the range of about 1600° to 1800° F. In vessel 2 the upward gas flow in made sufficient in velocity to create a turbulent mixing of the gas with the ore particles undergoing reduction. The spent reducing gas withdrawn overhead from vessel 2 by line 4 is useful as a fuel gas in a burner 5, which is employed for heating solids as will be explained later.

The higher oxides, $Fe_2O_3$ and $Fe_3O_4$, in ore particles are rapidly reduced to FeO in vessel 2. The resulting particles containing iron principally as FeO are withdrawn from the fluidized solids bed 6 in vessel 2 down through tube 7 and are transferred through line 8 to the final stage reduction vessel 9. In vessel 9 the FeO particles are fluidized by and contacted with a reducing gas of high reducing power at a temperature of about 1800° F., or in the range of about 1650° to 1800° F. in a suitable proportion for obtaining the reduction of FeO to Fe, that is sponge iron particles. The hot reducing gas is supplied to vessel 9 from a gas generator 10. The sponge iron particle product is withdrawn from vessel 9 through tube 11 and drawoff tube 12 from an upper part of the fluidized bed 13 in vessel 9. This partly spent reducing gas separated from the solid particles is withdrawn from vessel 9 through line 14 to the high temperature exhausting-compressor 15.

With the kind of gas supplied from the gas generator 10 to the final reduction vessel 9 through line 16 in the preferred operation the exhaust gas withdrawn from vessel 9 through line 14 retains a high enough reducing power with respect to $Fe_2O_3$ and $Fe_3O_4$ to permit most of this gas to be recycled via line 17 to the gas generating vessel 10. In an average typical operation only about one-third of the gas withdrawn from vessel 9 has to be diverted through line 3 to the initial reduction vessel 2 for bringing the iron oxide from the ferric oxide state to the ferrous oxide state in valence with the amount of ferrous oxide reduced in vessel 9. Thus, the major part of the gas exhausted from the vessel 9 is recycled through line 18 to the gas generator 10 even though this gas has a high content of $CO$ and $H_2$, its other components mainly $CO_2$ and $H_2O$ being present in a minor proportion. Very advantageously, it has been found that this gas in the nature of its composition, temperature, and quantity is suitable for use in the gas generator 10 to react with hydrocarbon fuel and thereby supply the correct amount of reducing gas needed in the final reduction stage of $FeO$ to $Fe$ in vessel 9 and also supply the needs of the initial reduction stage in vessel 2, provided heat is also supplied to the gas generator 10. This heat is conveniently obtained by use of heat carrier solids which are withdrawn from the burner vessel 5 through line 19 and are passed into the gas generator 10 through line 20 as the recycled gas mentioned is also introduced into the generator 10. The solids, in general, are to be heated at a higher temperature than the temperature of the gases since the reaction in the gas generator is preferably carried out at temperatures in the range of 1800° to 2100° F. While the hot recycled gases are being supplied to vessel 10 with the hot solids, a hydrocarbon fuel is introduced into the fluidized bed of solids formed in vessel 10. The hydrocarbon fuel may be a heavy fuel oil introduced through line 21 so as to become sprayed on the solids fluidized in the fluidized solids bed 22 within the gas generator 10. To maintain the desired reaction temperature in vessel 10 continuously with a continuous feed of the hot solids and recycled gas, solids are withdrawn from the fluidized bed 22 in vessel 10 through the tube 23 and are returned through line 24 to the burner 5. Air supplied from line 25 and compressor 26 is charged into vessel 5 through line 27 and may be used as a lift gas to carry the returning solids into vessel 5. In vessel 5 the solids are fluidized by the combustion gases formed in reacting air with combustible gas which is received as off-gas from the initial reducing vessel 2 through line 4. In vessel 5 the solids form a fluidized bed 28 and the combustible gas components $CO$ and $H_2$ are burned completely to $CO_2$ and $H_2O$ by a suitable proportion of air. The combustion gas product denoted as flue gas is withdrawn from the burner 5 through line 29. This hot flue gas may be used for drying and preheating ore that is supplied to the initial reduction stage. If necessary, additional fuel and air may be supplied to the burner 5 to obtain an elevated temperature therein, e.g., in the range of 2100° to 2400° F. The fact that air is introduced also into vessel 5 and thereby gives the flue gas a substantial nitrogen content is not adverse to the gas compositions in the other parts of the system, because this flue gas is not mixed with the other gases going to the gas generator or to the iron oxide reducing vessels.

If the fuel oil or hydrocarbon material supplied to the generator 10 contains sulfur in such amounts as to add excessive sulfur compounds to the reducing gas, e.g., $H_2S$, the reducing gas leaving the generator 10 through line 30 may be passed into a sulfur removing unit 31 which is indicated schematically. In this unit iron particles may be used for converting the sulfur compounds to iron sulfide, the iron particles being indicated as entering line 32 and the sulfurized iron being removed through line 33. The sulfurized iron may be accumulated and subjected to roasting for recovering iron oxide.

It will be understood that in the fluidization units schematically shown, conventionally known fluidization techniques which are well known may be used. For example, the fluidization units may be equipped with means for separating fine particles from the gases, such as the cyclone separator 38 indicated in the burner 5. The gas velocities are to be controlled for obtaining the desired amount of mixing of the solids with the gas and at the same time preventing excessive entrainment of the solids by the gas. Generally the gas velocity through the solids bed is in the range of 0.5 to 5 feet per second. The initial reduction stage may be subdivided into stages for reduction of $Fe_2O_3$ first into $Fe_3O_4$, which in another stage is reduced to $FeO$.

In the gas generation, the heat carrier solids which circulate from generator to burner and back to generator may be inert fluidizable particles of refractory material, such as fire clay, fused alumina, magnesite, dolomite, coke, sand, etc. The heat carrier solids may also be coated or impregnated with catalytic materials for aiding the reaction of the hydrocarbon fuel with $CO_2$ and $H_2O$ in producing $CO$ and $H_2$. The heat carrier solids may be of various porosities. These solids regardless of whether they are inert or catalytic may tend to have a deposit of some carbon formed in the gas generating vessel 10. Such carbon deposits are of course removed in the burner 5 by supplying sufficient air for burning off the carbon in addition to that needed to burn the gas from line 4. In any event, for the purpose of economizing on fuel requirements, with the presently described process the amount of hydrocarbon supplied to the gas generator 10 can be kept low enough so that the carbon and hydrogen of the hydrocarbon are converted mostly to $CO$ and $H_2$. The $H_2O$ in the recycled gas and the $CO_2$ in the recycled gas supply the oxygen which combines with the carbon of the hydrocarbon to produce the $CO$.

The principal novelty and advantages of the presently described process is in the method of forming, circulating, distributing, and utilizing the reducing gases as will be further explained in the following example.

EXAMPLE

Starting with finely divided hematite ($Fe_2O_3$), on the basis of 1 ton Fe to be produced from about 1.53 tons of the ore (65.5% Fe), this amount of hot ore particle fluidized is reduced by contact with 48 lb. mols of intermediate reducing gas at 1600° F. in a primary reducing zone to convert the $Fe_2O_3$ to $FeO$. This intermediate reducing gas is a minor portion (about one-third) of the off-gas coming from a final reducing vessel where the $FeO$ is reduced to $Fe$. This intermediate gas is maintained at a high temperature of at least 1700° F. in being transferred from the final reduction zone to the primary reduction zone. The compositions of the intermediate gas entering and of the tail gas leaving the primary reduction zone are shown in the following table:

*Table 1*

GAS COMPOSITIONS, PERCENT

|  | Intermediate Gas Entering Vessel 2 | Tail Gas Leaving Vessel 2 |
| --- | --- | --- |
| CO | 41 | 20 |
| $CO_2$ | 15 | 36 |
| $H_2$ | 28 | 13 |
| $H_2O$ | 16 | 31 |

The tail gas is suitable fuel for use in a burner where heat carrier solids are to be heated to 2250° F.

The intermediate reduced ore ($FeO$) is transferred from the initial reducing vessel to the final reducing vessel to be contacted therein at 1800° F. gas of higher reducing power from a gas generator. The intermediate reduced ore (FeO) resulting from 1.53 ore charged to the primary vessel is reduced for at least 85% metallization by 148 lb. mols of hot gas from the gas generator entering the final reducing vessel at 1850° F. The compositions of gas entering the final reducing vessel and of intermediate gas exhausted from this vessel are shown in the following table:

*Table 2*

GAS COMPOSITIONS, PERCENT

| | Generator Gas Entering Vessel 9 | Intermediate Gas Leaving Vessel 9 |
|---|---|---|
| CO | 54 | 41 |
| $CO_2$ | 1 | 15 |
| $H_2$ | 43 | 28 |
| $H_2O$ | 2 | 16 |

As mentioned, about one-third, 48 lb. mols, of the intermediate gas leaving vessel 9 is passed to the primary vessel 2. A remaining major part, about two-thirds, of the intermediate gas exhausted from vessel 9 is recycled to the gas generating vessel for reconversion of its $CO_2$ and $H_2O$ components to CO and $H_2$. This gas in being recycled is maintained at as high a temperature as practical to conserve and supply heat to the gas generating zone in vessel 10. A moderate amount of heat exchange cooling of this recycle gas to contract its volume can be carried out, e.g., to give the gas a temperature in the range of about 1200° to 1800° F., without seriously affecting the operability of the process. This cooling could be made ahead of a compressor in the recycle line 18. The gas is then further heated by the compressing.

With 100 lb. mols of the intermediate gas recycled to the gas generating vessel, the $H_2O$ and $CO_2$ components therein are converted almost entirely to CO and $H_2$ by reaction with 360 lbs. of hydrocarbon fuel oil preheated to about 400° F. and with necessary heat added by fluidized heat carrier solids from the burner to maintain a temperature of 1850° F. in the gas generating zone so as to produce 148 lb. mols of the generator gas having the composition shown in Table 2. In the burner vessel the heat carrier solids are heated to 2250° F. by burning 48 lb. mols of the tail gas from the initial reducing vessel with 38 lb. mols of air containing heat from compression.

In the operation described a circulation of 1200 lbs. coke or heat carrier solids from the burner to the gas generation zone gives the necessary heat balance per ton of Fe.

Pressure relationships depend mainly on the height and density of the fluid beds. In general, the pressures may be slightly above atmospheric pressure. For example, the intermediate gas may be under a pressure of 20 to 60 p.s.i.g., gas entering the vessel 9 under 10 to 30 p.s.i.g., and gas in lines 14 and 29 under a pressure near 0 p.s.i.g.

As illustrated by the example given on a continuous process of directly reducing higher oxides of iron to FeO in a preliminary stage and reducing the FeO to Fe in a final stage it is possible to make a large fuel saving by recycling a major part of the intermediate hot gas exhausted from the final stage to a gas generation zone where $H_2O$ and $CO_2$ in the recycled gas is reacted with hydrocarbon to form $H_2$ and CO and thereby generate economically a high temperature reducing gas utilizable in the first stage. In this operation sensible heat of the recycled gas is conserved, because there is no need for cooling to remove $H_2O$ and $CO_2$. Also, the reducing components CO and $H_2$ forming a major proportion of the recycled gas are conserved, because there is no need for purging to eliminate inert gases.

A distinguishing feature of the process is that the hot gas recycled from the FeO reducing zone or final stage to the gas generation zone contains sufficient $CO_2$ and $H_2O$ for reforming the hydrocarbon to CO and $H_2$ so as to restore the reducing gas used in the FeO reducing zone, while leaving enough reducing power in a minor portion of the off-gas from the final stage sent to the preliminary reduction stage for reducing $Fe_2O_3$ and $Fe_3O_4$ to the FeO that is then charged to the FeO reducing zone.

It is therefore significant that in the present process a major portion, e.g., about 55 to 75% of intermediate gas leaving the FeO reducing zone is not passed to the preliminary stage for reduction of higher oxides but is sent to the gas generation zone for the reconversion of $CO_2$ and $H_2O$ in the gas to CO and $H_2$ by reaction with hydrocarbon and coke made by cracking of hydrocarbon. The proportion of the intermediate gas diverted to the initial reduction stage vessel under the best conditions is about 35% but this proportion can be lowered down to nearly 10% and still give sufficient reduction in the initial stage, particularly if more fuel is supplied from an extraneous source for heat generation in the burner.

In the operation with about 30 to 35% of the intermediate gas passed to the initial reduction stage, the heating value of the tail gas from this stage passed to the burner vessel 5 can nearly supply adequate heat for the gas generator. Any deficiency can be corrected by adding available fuel to the burner vessel 5.

An exceptionally good accomplishment in fuel savings with the present process depends on the operation with a small amount of fuel for conversion of the $CO_2$ and $H_2O$ in intermediate gas recycled from the final stage to the gas generation zone. For example, with 100 mols of recycle gas containing mostly CO and $H_2$ and only about 30 mols $CO_2$ and $H_2O$, the fuel used for the conversion, whether it be heavy or light hydrocarbon oils, natural gas, or coke, only has to supply about 30 lb. atoms of carbon. Using hydrocarbon fuels of 75 to 85 wt. % carbon content, only about 320 to 350 lbs. of fuel is thus required to obtain the enriched gas suitable for the final stage of FeO in producing 1 ton of Fe.

What is claimed is:

1. In a continuous direct reduction of iron oxides by reducing gas in a fluidized bed wherein FeO is reduced to Fe in a final stage which receives a stream of hot reducing gas from a gas generating zone and higher oxides of Fe are reduced to FeO in a preliminary stage by a portion of intermediate partly spent reducing gas withdrawn from said final stage, the improvement which comprises passing a larger portion of said intermediate gas withdrawn from the final stage to the gas generating zone, said intermediate gas containing principally CO and $H_2$ with minor amounts of $CO_2$ and $H_2O$, converting $CO_2$ and $H_2O$ components of the intermediate gas passed into said generating zone to enrich the resulting gas with CO and $H_2$ in forming the stream of hot reducing gas which said final stage receives.

2. In a process for direct reduction of iron oxides in a fluidized bed wherein higher oxides are reduced to FeO in an initial stage zone and FeO is reduced in a final stage reducing zone to Fe with gas containing mainly CO and $H_2$, the steps which comprise removing from said final stage an intermediate exhaust gas containing CO and $H_2$ with $CO_2$ and $H_2O$ formed by reduction of the FeO, passing a minor portion of said intermediate exhaust gas at substantially process temperatures to said initial stage, recycling a major portion of said exhaust gas at substantially process temperatures to a gas generation zone to which hydrocarbon fuel and heat are supplied for reconverting $CO_2$ and $H_2O$ in said exhaust gas thus recycled to CO and $H_2$, and passing resulting gas enriched with CO and $H_2$ from the gas generation zone to the final stage reducing zone.

3. In the process of claim 2, said intermediate exhaust gas being substantially free of nitrogen.

4. In the process of claim 2, the step of removing sulfur-containing components of the gas passing from the gas generation zone to said final reducing stage.

5. In the process of claim 2, the step of passing a minor portion of the intermediate exhaust gas from the final reducing stage zone to the initial stage zone for contact with higher iron oxides undergoing reduction to FeO.

6. In the process of claim 2, the step of withdrawing reducing gas having an increased $CO_2$ and $H_2O$ content from the initial reducing stage zone to a burning zone in which CO and $H_2$ components of the thus withdrawn gas are burned to supply heat to heat carrier solids circulating to the gas generating zone.

7. In the process of claim 2, said intermediate gas being maintained at a temperature in the range of 1200° to about 1800° F. in being recycled to the gas generation zone.

References Cited in the file of this patent
UNITED STATES PATENTS

| | | |
|---|---|---|
| 2,471,104 | Gohr | May 24, 1949 |
| 2,547,685 | Brassert et al. | Apr. 3, 1951 |
| 2,740,706 | Paull et al. | Apr. 3, 1956 |
| 2,921,848 | Agarwal | Jan. 19, 1960 |